(12) United States Patent
Meitav et al.

(10) Patent No.: US 6,576,365 B1
(45) Date of Patent: Jun. 10, 2003

(54) ULTRA-THIN ELECTROCHEMICAL ENERGY STORAGE DEVICES

(75) Inventors: Arieh Meitav, Rishon Le-Zion (IL); Joel Lang, Givatayim (IL); Niles Fleischer, Rehovot (IL); David Lifschitz, Jerusalem (IL); Eugene Pecherer, Rishon Le Zion (IL); Eli Rosh Chodesh, Rishon Le Zion (IL); Joost Manassen, Rehovot (IL); Bharat Rawal, Surfside Beach, SC (US)

(73) Assignee: E.C.R. - Electro Chemical Research Ltd., Rehovot (IL)

( * ) Notice: Subject to any disclaimer, the term of this patent is extended or adjusted under 35 U.S.C. 154(b) by 67 days.

(21) Appl. No.: 09/717,940

(22) Filed: Nov. 21, 2000

Related U.S. Application Data

(60) Provisional application No. 60/168,761, filed on Dec. 6, 1999.

(51) Int. Cl.[7] .................. H01M 2/18; H01M 10/04; B05D 5/12; H01G 9/07
(52) U.S. Cl. .................. 429/130; 429/162; 429/210; 361/504; 427/123; 29/623.1; 29/623.5
(58) Field of Search .................. 429/130, 162, 429/210, 245; 427/123; 29/623.1, 623.5; 361/504

(56) References Cited

U.S. PATENT DOCUMENTS

| | | | |
|---|---|---|---|
| 3,920,477 A | * 11/1975 | Alaburda | .................. 429/162 |
| 4,488,203 A | 12/1984 | Muranaka et al. | |
| 5,350,645 A | * 9/1994 | Lake et al. | .................. 429/130 X |
| 5,382,481 A | 1/1995 | Fleischer | |
| 5,512,391 A | 4/1996 | Fleischer | |
| 5,550,706 A | 8/1996 | Kurzweil et al. | |
| 5,555,155 A | * 9/1996 | Patel et al. | .................. 361/504 X |
| 5,580,678 A | 12/1996 | Rossoll | |
| 5,580,681 A | 12/1996 | Fleischer | |
| 5,591,540 A | 1/1997 | Louie et al. | |
| 5,621,609 A | * 4/1997 | Zheng et al. | .................. 361/504 X |
| 5,626,729 A | 5/1997 | Thompson et al. | |
| 5,645,959 A | 7/1997 | Rowlette | |

(List continued on next page.)

FOREIGN PATENT DOCUMENTS

| | | |
|---|---|---|
| JP | 4348016 A | 12/1992 |
| WO | WO 9813887 | 4/1998 |

OTHER PUBLICATIONS

PCT Search Report for PCT/US00/42409, May 25, 2001.
Medical Plastics and Biomaterials—The Role of Conductive Films in Fabricating Precision Components for Medical Electronic Devices Jul. 1999.
International Search Report dated Apr. 2, 1998 for International Application No. PCT/US97/16901 filed Sep. 23, 1997.

Primary Examiner—Stephen Kalafut
(74) Attorney, Agent, or Firm—Dority & Manning, P.A.

(57) ABSTRACT

An ultra-thin electrochemical multi-cell energy storage device is provided within a single lightweight flexible casing. The energy storage device utilizes perforated isolating frames to form its internal structure. By adhering multi-layer current collectors to the perforated isolating frames, filling the openings formed therein with electrode material and stacking the current collectors with an electrolyte between the electrodes the assembly generated places the multiple cells in a plurality of stacks and all of the cells may be in series, parallel or some combination thereof by virtue of the assembly's construction. The external current collectors have good lateral conductivity due to their composite structure and provide for pressure insensitive interfacial contacts. The energy storage device advantageously exhibits low resistance, low ESR, and a high voltage/capacity while preferably remaining less than one millimeter thick.

51 Claims, 11 Drawing Sheets

U.S. PATENT DOCUMENTS

| | | | | |
|---|---|---|---|---|
| 5,646,815 A | | 7/1997 | Owens et al. | |
| 5,660,892 A | * | 8/1997 | Robbins et al. | 427/123 X |
| 5,728,485 A | | 3/1998 | Watanabe et al. | |
| 5,728,489 A | | 3/1998 | Gao et al. | |
| 5,729,424 A | | 3/1998 | Sharp et al. | |
| 5,729,427 A | | 3/1998 | Li et al. | |
| 5,729,428 A | | 3/1998 | Sakata et al. | |
| 5,730,761 A | | 3/1998 | Lake et al. | |
| 5,731,104 A | | 3/1998 | Ventura et al. | |
| 5,731,105 A | | 3/1998 | Fleischer et al. | |
| 5,733,683 A | | 3/1998 | Searson et al. | |
| 5,751,541 A | | 5/1998 | Li et al. | |
| 5,766,789 A | | 6/1998 | James et al. | |
| 5,807,412 A | | 9/1998 | Li et al. | |
| 5,847,920 A | | 12/1998 | Li et al. | |
| 5,849,025 A | | 12/1998 | Owens et al. | |
| 5,948,562 A | | 9/1999 | Fulcher et al. | |
| 5,986,878 A | | 11/1999 | Li et al. | |
| 5,989,741 A | | 11/1999 | Bloomfield et al. | |
| 6,051,341 A | * | 4/2000 | Terasaki | 429/245 X |
| 6,203,936 B1 | * | 3/2001 | Cisar et al. | 427/123 X |
| 6,225,009 B1 | | 5/2001 | Fleischer et al. | |
| 6,403,263 B1 | * | 6/2002 | Roach | 429/245 X |

* cited by examiner

CAPACITOR STACK

| FEATURE/CAP MODEL | | | |
|---|---|---|---|
| FOOT PRINT (mm) | 54x34 | 55x25 | 34x34 |
| HEIGHT (mm) | 0.5 | 0.5 | 0.8 |
| NOMINAL | | | |
| VOLTAGE (V) | 5 | 5 | 5 |
| ESR (mΩ) | 70 | 80 | 80 |
| CAP. (mF) | 100 | 80 | 80 |
| L.C. (µA) | <10 | <10 | <5 |
| TOTAL NUMBER UNIT CELLS | 6 | 6 | 6 |
| # UNIT CELLS/BI-POLAR ASSEMBLY | 2 | 2 | 3 |
| # BI-POLAR ASSEMBLIES IN SAME PLANE | 3 | 3 | 2 |

*FIG. 9*

| MATERIAL | THICKNESS (μm) | SHEET RESISTANCE (Ω/SQ.) | ρ (Ωcm) | R (X-Y) @xμm (mΩcm²) | R (Z) (mΩcm²) |
|---|---|---|---|---|---|
| CONDUCTIVE POLYMER FILM | 50 | 180 | 0.9 | 180,000 | 4.5 |
| CONDUCTIVE POLYMER FILM | 100 | 85 | 0.85 | 85,000 | 8.5 |
| Ni-(METAL) | 5 | | 8.0E-06 | 16 | 4.0E-06 |
| Ni-(METAL) | 10 | | 8.0E-06 | 8 | 8.0E-06 |
| Cu-(METAL) | 5 | | 1.7E-06 | 3 | 8.5E-07 |
| Cu-(METAL) | 10 | | 1.7E-06 | 2 | 1.7E-06 |
| CONDUCTIVE INK (GRAPHITE BASE) | 25 | 20 | 0.05 | 20,000 | 0.125 |
| CONDUCTIVE INK (Ag-Cu BASE) | 25 | 0.1 | 2.5E-04 | 100 | 6.3E-04 |
| CONDUCTIVE POLYMER FILM 50 μm-Ni 5μm | 55 | 0.015 | 8.25E-05 | 15 | 4.5 |
| COND. POLYMER FILM 50 μm-Ni 5μm/Cu 5μm | 60 | 0.0025 | 1.5E-05 | 3 | 8.5 |

*FIG. 10*

ULTRA-THIN ELECTROCHEMICAL ENERGY STORAGE DEVICES

REFERENCE TO RELATED APPLICATIONS

This application claims priority to Provisional Patent Application U.S. Ser. No. 60/168,761, entitled "Novel Enclosures for Electrochemical Capacitors and Batteries" filed Dec. 6, 1999, which is fully incorporated herein by reference.

BACKGROUND OF THE INVENTION

This invention generally relates to electrochemical systems for storage and release of electrical energy. In particular, the present invention relates to electrochemical systems for use in electronic circuits, for example, as capacitors or batteries. More particularly, the present invention relates to electrochemical systems for operation in electronic circuitry, for example, as capacitors or batteries, with either a non-liquid, organic solution, an aqueous solution or a protonic medium electrolyte material positioned between the electrodes.

Further still, the present invention relates to improved designs for bi-polar assemblies that address the deficiencies in existing bi-polar designs. In particular, this invention relates to an assembly of a plurality of single cells of an electrochemical system. More particularly, individual cells may be connected individually to each other to form a stack. Also, stacks may be connected together to form an assembly. Further, the present invention is more versatile for achieving inter-cell or inter-stack connections in series, parallel, or combinations thereof and for achieving hybrid packs of a battery or batteries combined with a capacitor or capacitors in a single package.

As electronic devices and other electrical apparatuses become increasingly more portable and provide more functionality, advances must be made in the components of such devices that enable such portability. As is often the case with current electronics technology, the limiting factor in both size and functionality of an electronic apparatus is the size and weight of its component parts and in particular, the size and weight of its energy storage components. Additionally, the miniaturization of electronics has seen the push towards integrating various components into a single device to save both room and weight within both portable and stationary devices.

The current main energy source used for portable electronics is the electrochemical battery and/or the electrochemical capacitor. One of the limiting features of such current energy storage components is the packaging of the electrochemical system and the interconnection among the cells comprising the system. The current convention is to house the active electrodes and electrolytic material in a metallic casing. This form of housing is available in a wide variety of shapes and sizes. In the past, however, this has lead designers to accommodate the form of the electronic device to the casing rather than adding either the battery or capacitor after designing the device as they choose. As a result, the metal can, as opposed to the functionality of the device, has influenced the design of such portable electronic devices.

Similarly, the ability to enhance voltage and/or current for a given circuit design has required multiple energy storage components within individual cans within the electronic device. Again, this has forced designers to accommodate the design based on the casings needed to house multiple capacitors or batteries.

Alternative packagings for capacitors are known. U.S. Pat. No. 5,591,540, issued to Louie et al., the entirety of which is herein incorporated by reference, discloses an electrochemical charge storage device. While useful for its purpose, the '540 device, however, provides only a single capacitor cell. With the need for incorporating multiple energy storage components into a single device, using the design of the '540 packaging simply repeats the space hungry designs of the past.

Further, in most electrochemical systems the electrodes are separated by a liquid solution. In the solution, referred to as an electrolyte, ions can move freely. It is not, however, always convenient to have a liquid present within an electrochemical system. The use of liquids has many disadvantages. First, the liquid may leak from the component. Second, the additional cell elements are required to keep the liquid absorbed between the electrodes. Finally, many of the liquids used are corrosive, caustic, or even flammable.

A liquid electrolyte also has implications for cell design. Typically, liquid electrolyte electrochemical systems are built as individual cells in order to contain the liquid between the electrodes. Since in many applications an operating voltage greater than that capable of being provided by an individual cell is required, a plurality of cells need be connected into a pack to achieve a specified voltage.

U.S. Pat. No. 4,488,203, issued to Muranaka et al., the entirety of which is herein incorporated by reference, discloses an electrochemical double-layer capacitor. While useful for its purpose, the '203 device discloses only a single capacitive cell "separated from one another in a simple manner." (See column 2, lines 3–5 of U.S. Pat. No. 4,488,203) Additionally, while capable of being stacked to form a plurality of capacitor cells in series, the '203 device requires significantly more space and results in additional weight which a truly integrated plurality of capacitor cells within a single component would not.

It is, therefore, desirable to provide an ultra-thin multi-cell energy storage component that may comprise an electrochemical capacitor, a double-layer capacitor or a battery. In an electrochemical capacitor version of the present invention, which may also be referred to as a pseudo-capacitor or batcap, the electrodes comprise material that may participate in reversible charge transfer reactions. Thus, a portion of the energy is stored in the double-layer at the surface of the electrodes and another portion is contributed by the charge transfer reactions. In a double-layer capacitor version of the present invention, essentially all of the energy is stored in the double layer at the surface of the electrodes. In a battery version of the present invention, the anode and cathode materials are specifically chosen so that each reacts during operation of the cell. The chemical energy that is stored in the electrodes is converted to electrical energy via charge transfer reactions of active materials.

It is also desirable to provide a new packaging for an electrochemical multi-cell energy storage component for a single electronic device wherein the cells are in series or parallel or a combination thereof by virtue of the component's construction in one integrated structure. The packaging material needed for such a method must be a lightweight, flexible material which is inexpensive and can be processed with current processing techniques and tools.

SUMMARY OF THE INVENTION

The present invention recognizes and addresses various of the foregoing limitations and drawbacks, and others, concerning both the designs of electrochemical multi-cell energy storage components and methods of making the same. Therefore, the present invention provides an improved ultra-thin electrochemical multi-cell energy storage component comprising electrochemical capacitors, double-layer capacitors or batteries or combinations thereof that are connected in series, parallel or some combination thereof, in addition to an improved method of making the component.

It is, therefor, a principle object of the subject invention to provide an improved electrochemical multi-cell capacitor and/or battery. More particularly, it is an object of the present invention to provide an electrochemical multi-cell capacitor and/or battery within an improved casing. In such context, it is still a more particular object of the present invention to provide an electrochemical multi-cell capacitor and/or battery wherein the improved casing is made of a film material.

Another more particular object of the present invention is to provide an electrochemical multi-cell capacitor and/or battery with a low resistance. In such context, it is a principle object of the present invention to provide an electrochemical multi-cell capacitor with a low equivalent series resistance (hereinafter, ESR) and a high capacity.

It is still a further object of the present invention to provide an ultra-thin electrochemical multi-cell capacitor and/or battery. In such context, it is a more particular object of the present invention to provide an electrochemical multi-cell energy storage component which by virtue of its construction places the multiple connected cells in series, parallel or a combination thereof and allows a single common current collector to form the series connection between two cells or stacks of cells in the same plane.

It is a further object of the present invention to provide an ultra-thin electrochemical energy storage component that is simple and cost-effective to manufacture.

Additional objects and advantages of the invention are set forth herein, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent steps, means, features, and materials for those shown or discussed, and the functional or positional reversal of various steps, parts, features, or the like.

Still further, it is to be understood that different embodiments, as well as different presently preferred embodiments, of this invention, may include various combinations or configurations of presently disclosed steps, features, elements, or their equivalents (including combinations of steps, features or configurations thereof not expressly shown in the figures or stated in the detailed description).

These and other features, aspects and advantages of the present invention will become better understood with reference to the following description and appended claims. The accompanying drawings, which are incorporated in and constitute a part of this specification, illustrate an embodiment of the invention and, together with the description, serve to explain principles of the invention.

In one exemplary embodiment, there may be provided a multi-cell capacitor that comprises two elements of conductive polymer current collectors coated with a metallic film and adhered to a plastic perforated isolating frame. Such a combination forms a current collector assembly. Within the openings formed in each of the perforated isolating frames is present a high surface area carbon-based electrode material to form capacitive electrode plates. Where a current collector longitudinally electrically connects two iso-planar cells in series, the current collector is referred to as a common current collector. Where a current collector connects only a single cell to some external circuitry or contacts the end cell of a stack of cells, thereby connecting the stack to some external circuitry, the current collector is referred to as a terminal current collector. Such common and terminal current collectors are used externally to the stack or stacks of cells.

A bi-polar current collector assembly, for use internal to a stack of cells connected in series may comprise two plastic perforated isolating frames attached to both sides of a single conductive polymer current collector. The conductive polymer current collector within the bi-polar assembly need not have a metal film coating. On the top and bottom sides of the bi-polar current collector assembly in the openings formed within the perforated isolating frames may be placed the same high surface area carbon-based electrode material to form electrode plates. Such a bi-polar current collector, while primarily used for internal electrical connection within a stack, may also be electrically connected to external circuitry.

The capacitor device may be formed by stacking the external current collector assemblies with the bi-polar current collector assembly or assemblies. On each side of the bi-polar current collector are electrode plates which are separated by proton conductive polymer membranes. The membranes function as a proton conductive layer within each capacitor cell. The capacitor may then be housed within a laminate casing comprising a lightweight flexible non-conductive material, such as polyester coated with a metallic film. The casing may then be hermetically sealed around its periphery to encase the capacitor.

Openings may be left in the periphery for the passage of tab structures. These tab structures may serve as a point for electrical connection between external electronic circuitry and either common current collectors, terminal current collectors, or bi-polar current collectors. The openings may be sealed with a pressure sensitive cold adhesive, thermal adhesive or other type of sealant.

In another exemplary embodiment, the perimeter of the outer casing may be completely hermetically sealed. In the upper surface of the casing may exist two pre-punched holes for electrical connection between the current collector assemblies and the tabs. This places the tabs external to the capacitor device and reduces the occurrence of short circuits and vapor loss and enhances the ease of production and flexibility of tab positioning.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 is a table comparing the physical characteristics and performance data of various ultra-thin electrochemical capacitors made in accordance with the present invention; and FIG. 10 is a table comparing physical characteristics, lateral conductivity, and directional resistivities of current collectors of various materials. The current collectors consist of either a single layer, a bi-layer or a tri-layer structure wherein the conductivity of a current collector comprising a conductive polymer film is improved by the addition of a metal layer.

Figure 1A:
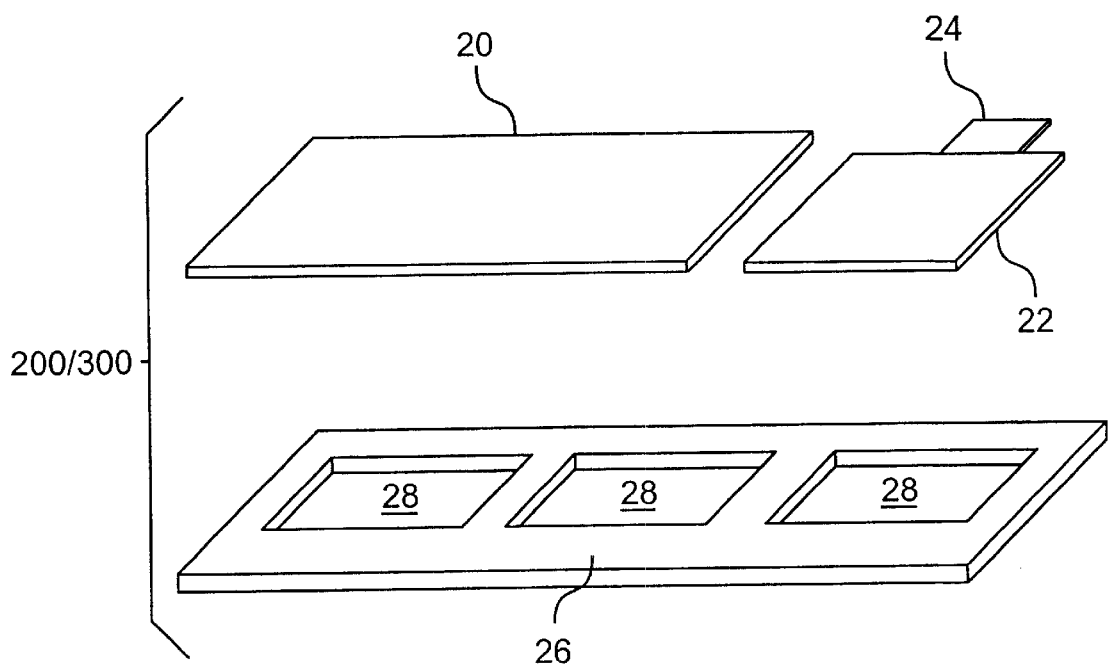
FIG. 1A is an exploded isometric view of a metal coated common current collector and a metal coated terminal current collector with a tab structure attached and a perforated isolating frame.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

As disclosed above, the present invention is particularly concerned with an improved ultra-thin electrochemical multi-cell energy storage device wherein the cells or stacks of cells are in series or parallel or a combination thereof by virtue of the component's construction and an improved packaging therefor. The present invention is applicable to generate double-layer capacitors, pseudo-capacitors, and/or batteries, as well as, combinations thereof fabricated together or individually in a given device. Generally, the thickness of such an energy storage device is between about 0.3 and about 3 millimeters, and preferably between about 0.3 and about 1 millimeter.

In accord with the present invention, it is possible to fabricate such an ultra-thin electrochemical systems with a low internal resistance of less than 100 m$\Omega$ by placing individual cells or bi-polar stacks in a common perforated isolating frame and connecting them by means of a series connected common current collector that is not bi-polar. Within the system, the present invention provides greater versatility in achieving inter-cell or inter-stack connections in series, parallel or a combination thereof. Further, such systems may advantageously demonstrate a high voltage/capacitance value while maintaining a correspondingly low ESR and internal resistance.

FIG. 1A depicts a non-conductive plastic perforated isolating frame 26. Such a frame 26 forms the common internal structure of the cells or bi-polar stacks of the present invention. The common frame 26 allows for a bi-polar stack or single cell subassemblies to be generated in-plane. The frame 26 may be generally rectangular or other shape with any number of openings 28 therethrough. As shown, one exemplary preferred embodiment has three openings 28 within the perforated isolating frame 26.

Additionally depicted in FIG. 1A is a pair of current collectors 20 and 22. The common current collector 20 connects the external electrodes of iso-planar cells in two adjacent stacks. The terminal current collector 22 connects the external electrode of an iso-planar cell with external circuitry via a unitary tab structure 24. Due to the planar geometry of the present invention the electrical connections between cells and stacks of cells require very good lateral conductivity. Additionally, the interfacial contacts need to be pressure insensitive. While metal foils provide outstanding lateral conductivity, their interfacial contacts may be pressure sensitive. Conductive polymers and polymer composites with conductive fillers have good practical transverse conductivity but poor lateral conductivity. It is preferred that the two materials be combined in a manner that provides the high lateral conductivity of a metal, metal alloy or metallic film with the pressure insensitivity of the conductive polymer or polymer composite with conductive fillers or some combination thereof.

In one preferred embodiment, therefor, the common and terminal current collectors 20 and 22 consist of at least two materials. The first layer is a conductive polymer layer that is in contact with the cell electrode. The second conductive structure 52 is preferably a metal, metal alloy, metallic film or a combination or mixture thereof displaying high conductivity, low contact resistance, and good adhesive properties to the conductive polymer layer or polymer composite in order to increase the lateral conductivity of the common and terminal current collectors 20 and 22. Unfortunately, many materials that exhibit high lateral conductivity and low cost are not stable in the presence of the electrolytes commonly used in double-layer capacitors, pseudo-capacitors, and batteries. As a result, the preferred embodiment of the common and terminal current collectors 20 and 22 has a composite second structure comprising a conductive material or combination of materials that are stable when in contact with such electrolytes and a metal, metal alloy or metallic film. Alternatively, a plurality of metals, metal alloys, metallic films or combinations or mixtures thereof each of a differing composition may be used in conjunction with the conductive polymer layer.

One exemplary such conductive material is a polymer film or a carbon-plastic composite film. The metal, metal alloy, metallic film or combination or mixture thereof may be, but is not limited to, nickel, chromium, lead, tin, silver, titanium, brass, gold, copper or bronze. The conductive polymeric layer may be deposited onto the metal, metal alloy, metallic film or combination or mixture thereof substrate using, but not limited to, any of the following methods: screen printing, brush painting, propellant spraying/air brushing, or casting. Alternatively, the metal, metal alloy, metallic film or combination or mixture thereof may be deposited onto the conductive polymer layer substrate using, but not limited to, any of the following methods: vacuum deposition, flame spray coating, molten bath dipping, heat lamination, electro-less deposition, electroplating, plasma deposition, sputtering, or propellant spray/air brushing in a carrier.

Alternatively, the common and terminal current collectors 20 and 22 may comprise any number of layers. The combination of layers and materials may be adjusted to achieve a desired combination of features including stability, lateral conductivity, interfacial contact resistance with the conductive polymer layer, pressure insensitivity, solderability, creep, passivation, contact resistance, and permeability to the electrolyte, as well as, achieving the desired performance characteristics of the overall energy storage component.

Attached to or as an extension of the terminal current collector 22 may be a unitary tab structure 24 for electrical connection to other external electrical devices or circuitry. Unitary tab structure 24 may comprise the same multiple layer conductive polymer or polymer composite with conductive fillers or a combination thereof as common and terminal current collectors 20 and 22.

Figure 1B:
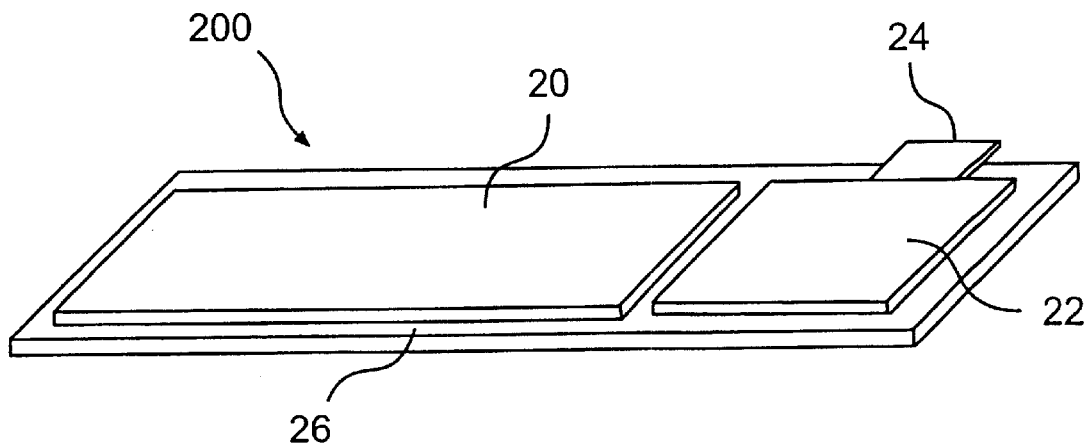
FIG. 1B is an isometric view of a combination of the elements in FIG. 1A forming a current collector assembly.

As shown in FIG. 1B, common current collector 20 may be adhered to the perforated isolating frame 26 in such a manner as to cover two of the three exemplary openings 28 therein. Similarly, external terminal current collector 22 may be adhered to the perforated isolating frame 26 in such a manner to cover the remaining exemplary opening 28. A pressure sensitive cold adhesive may be used for joining the elements of the energy storage component. Such a combination of the common and terminal current collectors 20 and 22 and the perforated isolating frame 26 collectively form an external current collector assembly 200 in accordance with the present invention.

Figure 1C:
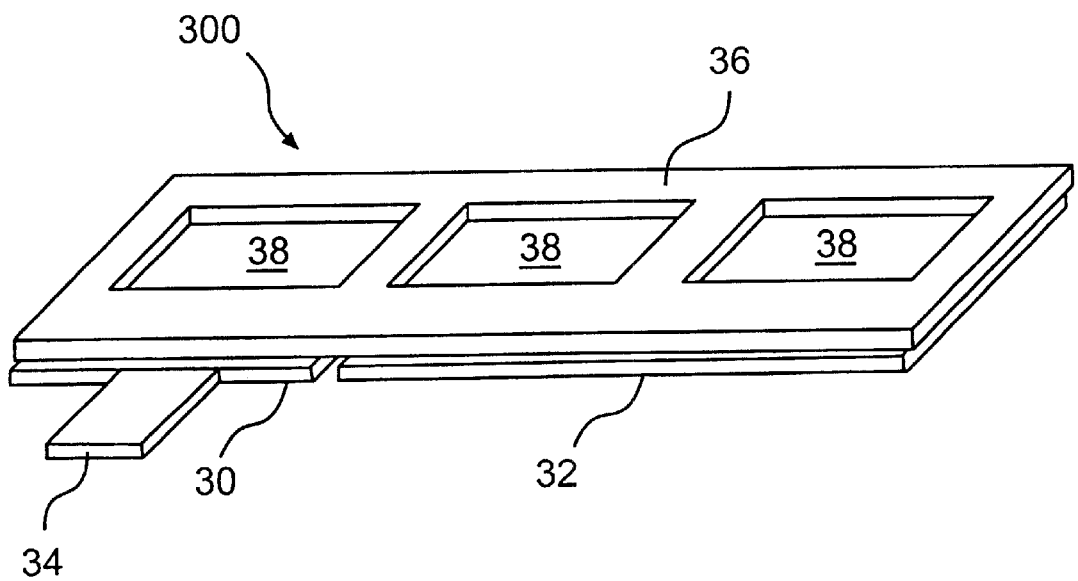
FIG. 1C is an isometric view of a current collector assembly opposite that shown in FIG. 1B and thus forming the top and bottom of the device.
Figure 1D:
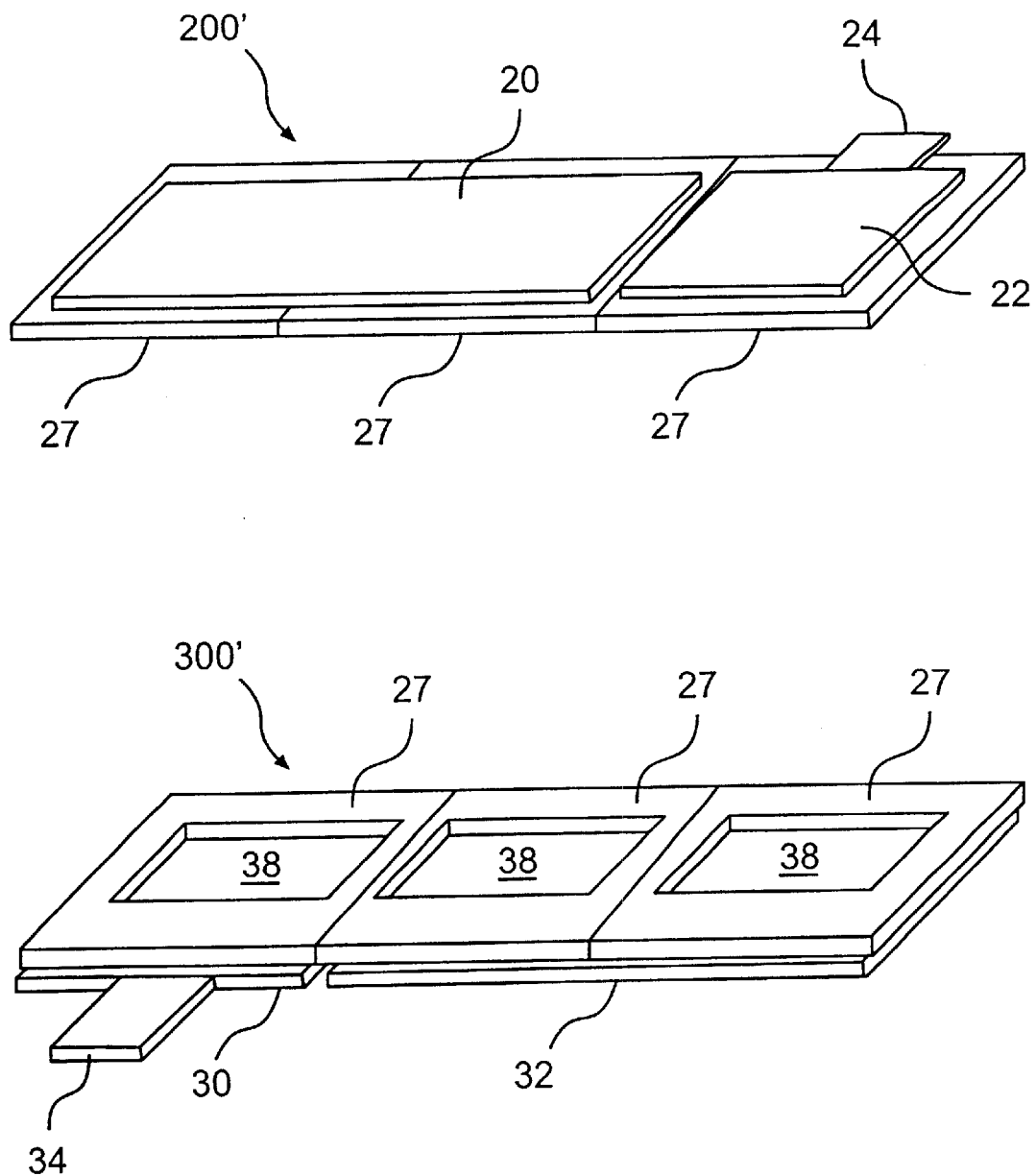
FIG. 1D is an isometric view of an alternative embodiment of the current collector assemblies in FIGS. 1B and 1C, with multiple iso-planar individual single opening frames forming the perforated isolating frame.

FIG. 1C depicts an external current collector assembly 300 comprising a pair of a terminal and a common current collector 30 and 32 adhered to a perforated isolating frame 36 in such a manner to cover the openings 38 therein. A tab structure 34 for electrical connection to other external electrical devices or circuitry may be electrically connected to or be an integral extension of terminal current collector 30. External current collector assembly 300 is a mirror image of external current collector assembly 200 and they may serve as lower and upper subassemblies, respectively, of a stack of cells required to form the ultra-thin electrochemical energy storage device. FIG. 1D depicts an alternative embodiment of the assemblies 200' and 300', wherein each perforated isolating frame is made of a plurality of individualized single opening frames 27 which are iso-planar. Such assemblies 200' and 300' would allow for greater flexibility of the overall device.

Figure 2A:
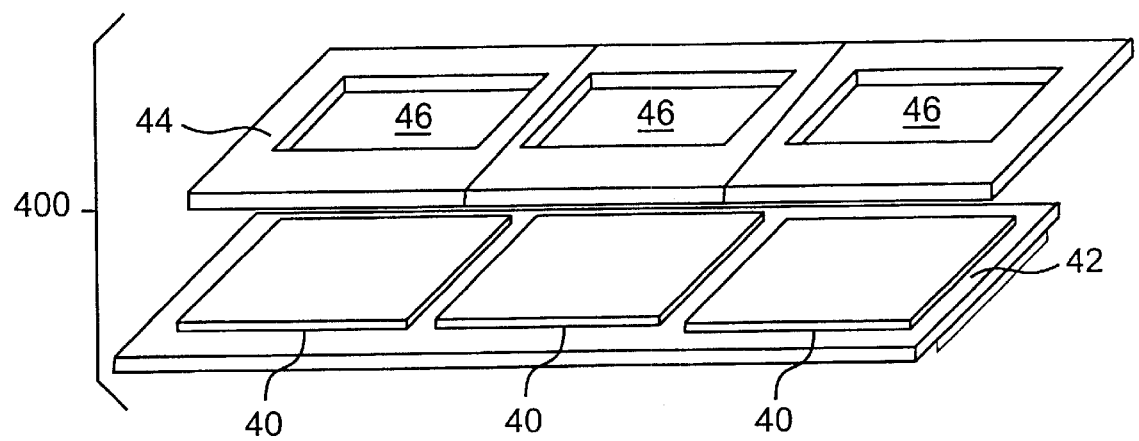
FIG. 2A is an partially exploded isometric view of a bi-polar current collector, including two perforated isolating frames encasing conductive polymer current collectors without tab structures.

For use internal to the stack, a bi-polar current collector assembly 400 may be required between external current collector assemblies 200 and 300. FIG. 2A depicts a partially exploded view of a bi-polar current collector assembly 400. In a preferred embodiment, a bi-polar current collector assembly 400 may include a set of three bi-polar current collectors 40. Such internal bi-polar current collectors, however, do not have a metal, metal alloy, metallic film or combination or mixture thereof as a facing. Instead, such a bi-polar current collector preferably comprises an electrically conductive polymer film or carbon/plastic composite film.

Figure 2B:
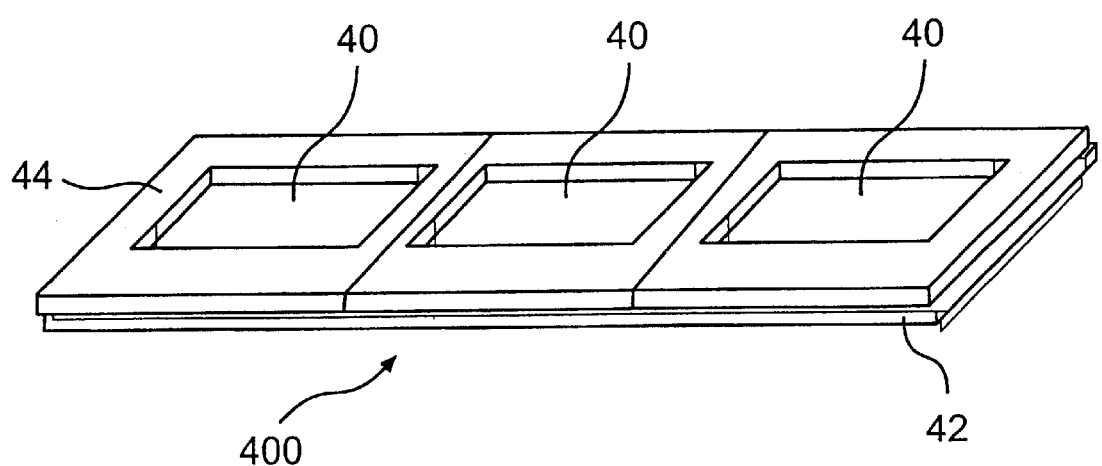
FIG. 2B is an isometric view of a combination of the elements in FIG. 2A forming a bi-polar current collector assembly.

Further, the bi-polar current collector assembly 400 may include two perforated isolating frames 42 and 44, and as in external current collector assemblies 200 and 300, there may be openings 46 formed within the common perforated isolating frames 42 and 44. The bi-polar current collectors 40 may be adhered between isolating frames 42 and 44 as shown in FIG. 2B. As desired by the user more than one bi-polar current collector assembly 400 may be included within the device to further increase the number of internal cells.

Figure 3:
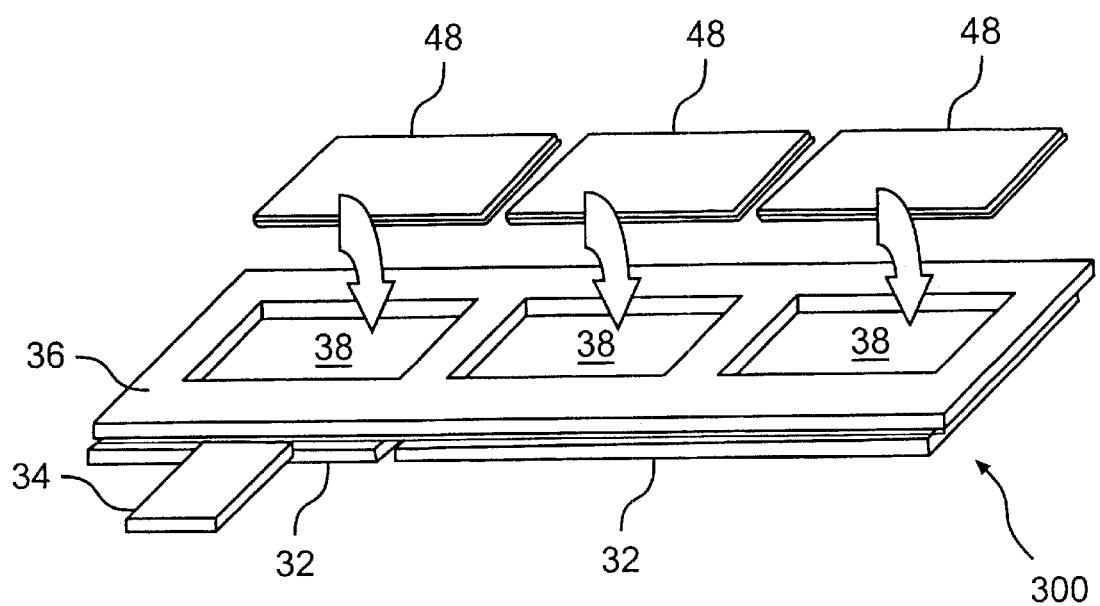
FIG. 3 is an exploded isometric view of the formation of the electrode plates in the perforated isolating frame of the current collector assembly of FIG. 1C.

In openings 28, 38, and 46 within the common perforated isolating frames 26, 36, 42, and 44, may be placed an electrode material comprising a high surface area carbon-based material 48. Such a material may work to form electrode plates 48. As shown in FIG. 3, showing exemplary external current collector assembly 300, placing such an electrode 48 within the openings 38 of the perforated isolating frame 36 results in the formation of three electrode plates. The electrode preferably comprises a carbon material mixed with an aqueous acid, such as but not limited to, sulfuric acid. The sulfuric acid concentration may range from about 1 to about 8 molar and the carbon content of the electrode may range from about 8 to about 36 weight per cent. Preferably the electrode thickness ranges from about 30 to about 300 microns. Alternatively, other aqueous acid solutions or other proton containing solutions may be used.

In one exemplary embodiment of the electrochemical energy storage device, the electrodes comprise a high surface area carbon and a protonic medium. The protonic medium may be a material such as, but not limited to, water, aqueous acid solutions, sulfonic acids, poly-sulfonic acids such as polyvinyl sulfonic acid, protonic acids, compounds with one or more alcoholic hydroxyl groups, compounds with one or more carboxylic acid groups, compounds with one or more of the following groups: sulfonimides, —$PO_2H_2$, —$CH_2PO_3H_2$, —$OSO_3H$, —$OPO_2H_2$, —$OPO_3H_2$, —$OArSO_3H$), and combinations thereof.

Figure 4:
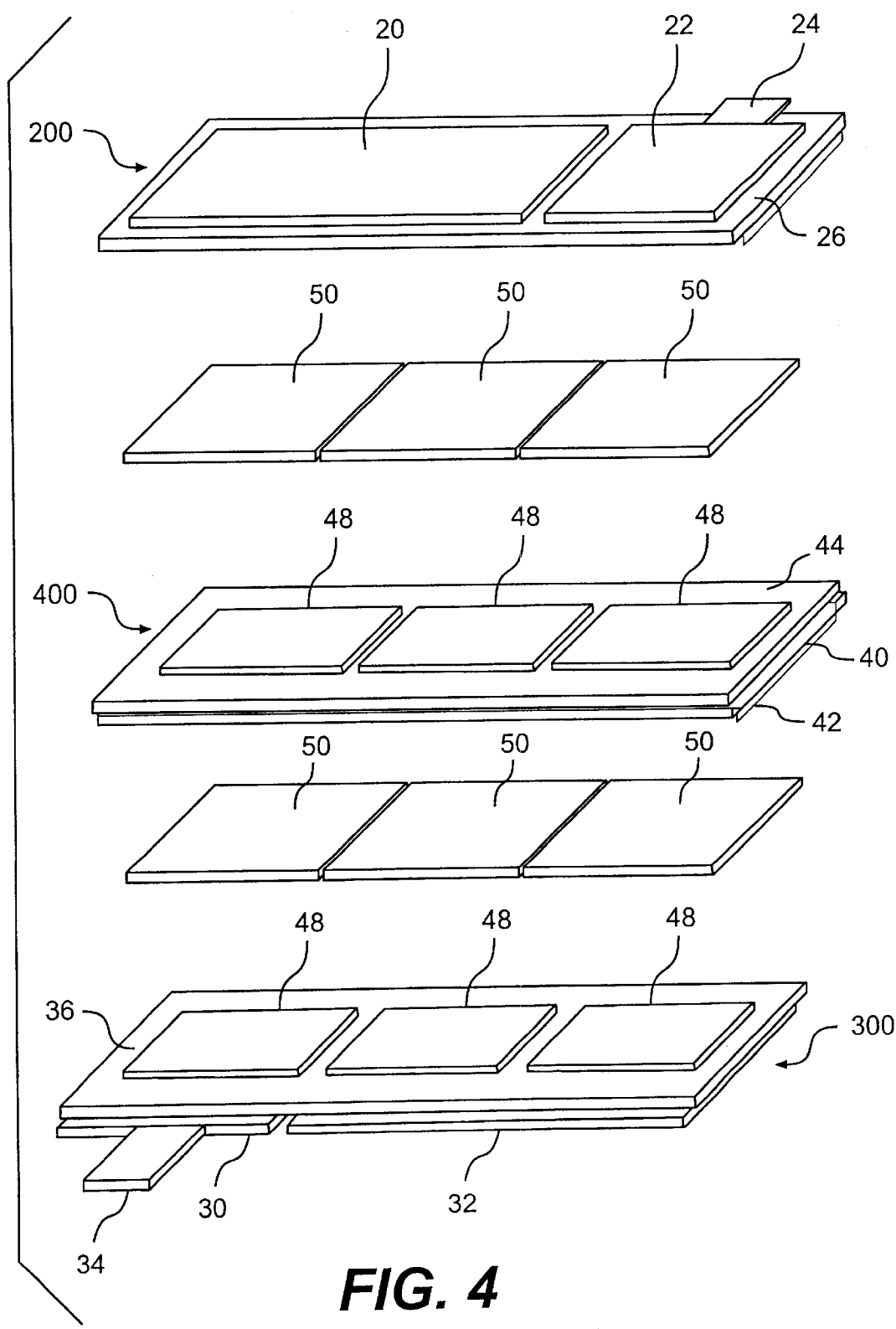
FIG. 4 is an exploded isometric view of a complete device comprising three stacks of cells.

In one exemplary embodiment of the present invention the electrolyte may comprise an organic solvent. In an alternative exemplary embodiment of the present invention the electrodes of the electrochemical energy storage cells comprise active materials that participate in charge transfer reactions. In yet another exemplary preferred embodiment an ultra-thin electrochemical multi-celled assembly may be formed, as shown in FIG. 4, by utilizing the external and bi-polar current collector assemblies 200, 300, and 400 with their respective electrode plates 48 by stacking the assemblies 200, 300, and 400 and separating them each with a proton conductive polymer membrane 50. The membranes 50 function as a proton conductive layer between the opposing electrode plates 48 of the stacks.

Figure 5:
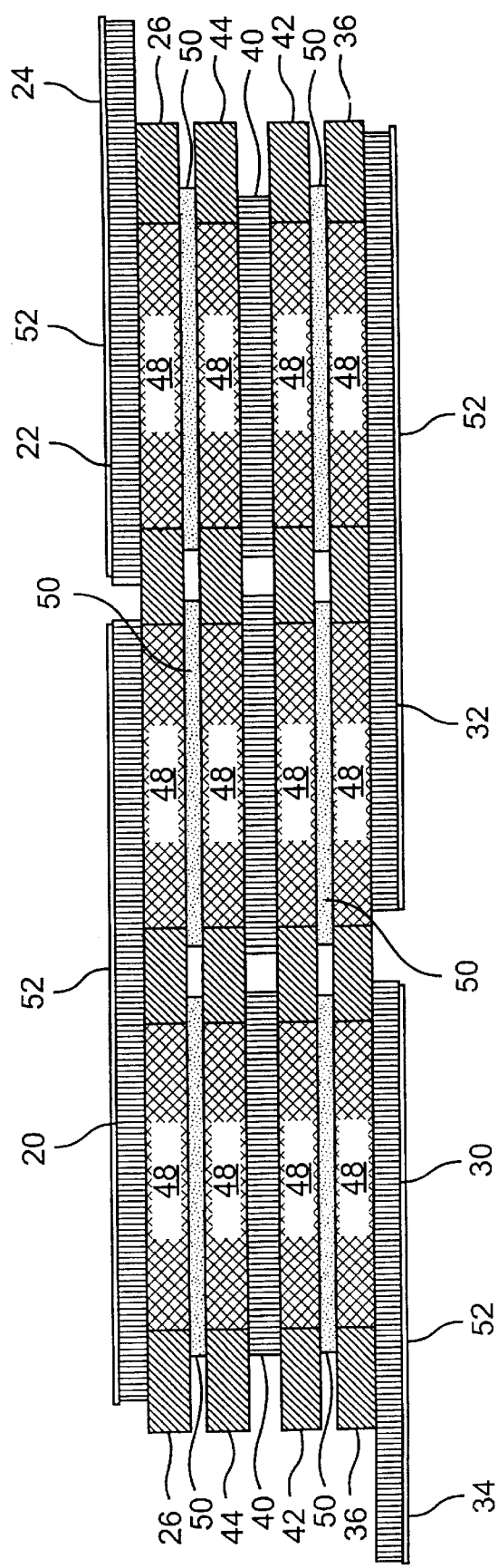
FIG. 5 is a cross-sectional view of the complete device shown in FIG. 4 showing the three stacks of cells connected in series.

FIG. 5 depicts such an exemplary assembly that results in the creation of six unit cells in series stacked two high in three separate stacks. By virtue of the capacitor's construction the capacitor cells are in series. The current flow through the capacitor stack may begin in tab structure 34, flow laterally into external terminal current collector 30, up the left stack of two cells to common current collector 20. (Left, right and center are used only in relation to the current figure for reference purposes only.) The current may then flow down the center stack to reach common current collector 32 and finally up the right stack to external terminal current collector 22 and out the unitary tab structure 24. Alternatively, the current may flow in the opposite direction due to the use of materials in the construction of the electrodes 48 that are capable of participating in reversible charge transfer reactions.

Figure 6:
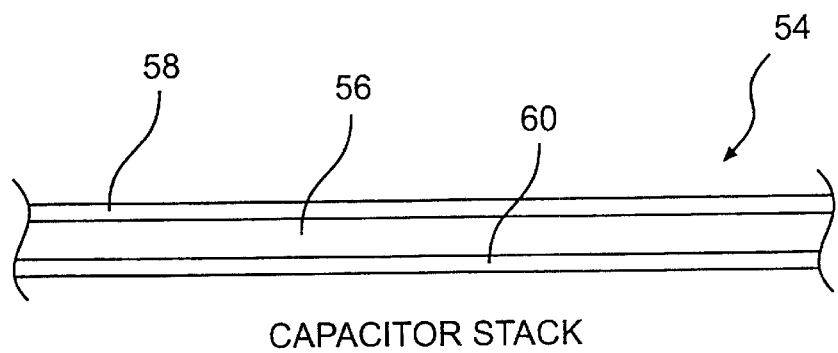
FIG. 6 is a cross-sectional view of the laminate outer casing of the present invention.

The electrochemical energy storage device may be housed in an outer casing 54. The casing 54 is preferably a lightweight flexible non-conductive laminate. As shown in FIG. 6, the casing 54 may comprise a laminate of a non-conductive polyester material 56 with an outer metallic film 58 and an inner adhesive layer 60 to maintain contact with the internal assembly. By placing the metallic film 58 on the outer surface of the casing 54, the chances of a short circuit may be reduced should the adhesive layer 60 degrade and allow contact between the non-conductive polyester 56 and the conductive film coating 52 on either external current collector assemblies 200 and 300. Alternatively, the non-conductive polyester material 56 may comprise the outer layer and the metallic film 58 may serve as a middle layer. Still further, the device requires no outer casing at all and the external current collector assemblies 200 and 300 may serve as the "outer casing" of the device.

Figure 7:
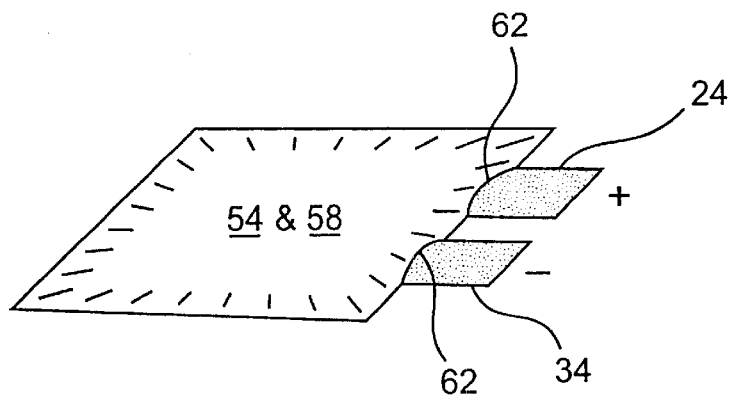
FIG. 7 is an isometric view of an exemplary embodiment of the present invention showing tab structures extending through the sealed edges of a device constructed in accordance with the present invention.

As seen in a preferred embodiment of the present invention in FIG. 7, the internal ultra-thin electrochemical energy storage assembly may be housed within a laminate casing 54. The casing 54 may be hermetically sealed around substantially its entire outer periphery to encase the assembly. The openings 62 left in the periphery may be for the passage of the unitary tab structures 24 and 34. These unitary tab structures 24 and 34 may serve as a point for electrical connection with external electronic components or circuitry. The openings 62 may be sealed with a pressure sensitive cold adhesive, thermal adhesive or any other sealant to prevent loss of vapor from the solution within the electrochemical cells.

Figure 8:
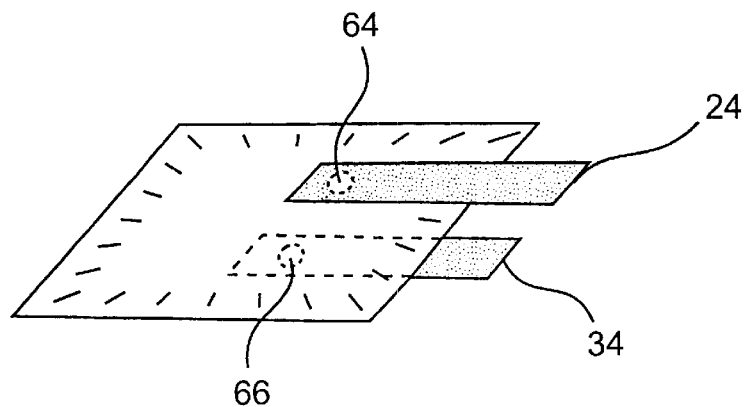
FIG. 8 is an isometric view of an alternative embodiment showing tab strcutures in accord with the present invention as individual elements electrically connected to current collectors through pre-punched holes in the face of the device's outer casing.

In an alternative exemplary preferred embodiment, as shown in FIG. 8, the perimeter of the laminate casing 54 may be completely hermetically sealed. In a face of the laminate casing 54 may exist two pre-punched holes 64 and 66 for electrical connection between the external terminal current collectors 22 and 30 and tab structures 24 and 34. In this alternative embodiment, the tab structures 24 and 34 are separate and individual structures from the external terminal current collectors. Their electrical connection through the pre-punched holes 64 and 66 to the external terminal current collectors 22 and 30 may serve to further reduce the potential occurrence of short circuits and vapor loss which may occur with any openings 62 in the outer periphery of the laminate casing 54. Additionally such a method of connection enhances the ease of production and flexibility of tab structure positioning.

EXAMPLES

FIG. 9 provides a table comparing various ultra-thin electrochemical capacitors made in accordance with the present invention and showing the physical characteristics and performance levels of the present invention. Several examples from the table in FIG. 9 are as follows:

Example 1

A double layer capacitor energy storage device was constructed from six cells. The design is per FIGS. 1–5. The cells were connected as three stacks connected in series. Each stack consisted of two bi-polar connected cells. Each cell includes an anode and cathode, a proton conductive polymer membrane between the electrodes, a single layer of a carbon/plastic composite electrically conductive film and common and terminal current collectors. The anode and cathode comprise high surface area carbon powder and an aqueous solution of sulfuric acid. The current collectors comprise a first layer of a conductive carbon composite film that are in contact with the external electrodes of each cell stack and a second outer metal layer. The dimensions of this component are 54×34×0.5 mm.

Example 2

A double layer capacitor energy storage device was constructed from six cells. The design is per FIGS. 1–5. The cells were connected as three stacks connected in series. Each stack consisted of two bi-polar connected cells. Each cell includes an anode and cathode, a proton conductive polymer membrane between the electrodes, a single layer of a carbon/plastic composite electrically conductive film and common and terminal current collectors. The anode and cathode comprise high surface area carbon powder and an aqueous solution of sulfuric acid. The current collectors comprise a first layer of a conductive carbon composite film that is in contact with the external electrodes of each cell stack and a second outer metal layer. The dimensions of this component are 54×25×0.5 mm.

Example 3

A double layer capacitor energy storage device was constructed from six cells. The design is per FIGS. 1–5. The cells were connected as two stacks connected in series. Each stack consisted of three bi-polar connected cells. Each cell includes an anode and cathode, a proton conductive polymer membrane between the electrodes, a single layer of a carbon/ plastic composite electrically conductive film and common and terminal current collectors. The anode and cathode comprise high surface area carbon powder and an aqueous solution of sulfuric acid. The current collectors comprise a first layer of a conductive carbon composite film that is in contact with the external electrodes of each cell stack and a second outer metal layer. The dimensions of this component are 34×34×0.8 mm.

FIG. 10 provides a table comparing several materials available for use in a two layer common or terminal current collector with regard to their lateral conductivity and directional resistivity characteristics.

Although preferred embodiments and examples of the invention have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. An electrochemical energy storage device, comprising:
   a plurality of frames stacked generally parallel to each other, wherein each of said plurality of frames form more than one opening;
   a plurality of current collectors, said current collectors being affixed to said plurality of frames;
   a plurality of electrodes, said plurality of electrodes being affixed within said openings in said plurality of frames; and
   a plurality of proton conductive membranes, wherein each of said membranes is between a pair of opposing ones of said electrodes and wherein said pair of opposing electrodes and associated proton conductive membrane defines a cell.

2. An electrochemical energy storage device as in claim 1, wherein said plurality of frames are a non-conductive material.

3. An electrochemical energy storage device as in claim 2, wherein said non-conductive material comprises a plastic.

4. An electrochemical energy storage device as in claim 1, wherein said plurality of current collectors comprise at least one bi-polar current collector which remains internal to the device, at least one common current collector which provides external longitudinal electrical connection between in-plane cells, and external terminal current collectors which provide for electrical connection of the device to external circuitry.

5. An electrochemical energy storage device as in claim 4, wherein said at least one common current collector further comprises a unitary extension tab structure.

6. An electrochemical energy storage device as in claim 4, wherein said external terminal current collectors further comprise a unitary extension tab structure.

7. An electrochemical energy storage device as in claim 4, wherein said at least one common current collector and said external terminal current collectors are multi-layered.

8. An electrochemical energy storage device as in claim 7, wherein said at least one common current collector and said external terminal current collectors comprise a conductive polymer layer adjacent to said plurality of electrodes when affixed to said frames and a second conductive structure on a side of said conductive polymer layer opposing said plurality of electrodes.

9. An electrochemical energy storage device as in claim 8, wherein said conductive polymer layer includes at least one of a conductive polymer, a polymer composite including a conductive filler or a combination thereof and wherein said conductive polymer layer serves as a substrate.

10. An electrochemical energy storage device as in claim 9, wherein said second conductive structure includes at least one layer of a metal, a metal alloy, a metallic film or a combination or mixture thereof as a facing on said substrate.

11. An electrochemical energy storage device as in claim 10, wherein said at least one layer of a metal, metal alloy, metallic film or a combination or mixture thereof includes at least one of the group comprising: nickel, chromium, lead, tin, silver, titanium, brass, gold, copper and bronze.

12. An electrochemical energy storage device as in claim 10, wherein said at least one layer of a metal, a metal alloy, a metallic film or a combination or mixture thereof is disposed onto said substrate by one of the group of techniques consisting of:
   vacuum deposition;
   flame spray coating;
   molten dip bath;
   heat lamination;
   electro-less deposition;
   electroplating;
   plasma deposition;
   sputtering; and
   propellant spray/air brush of metal particles in a carrier.

13. An electrochemical energy storage device as in claim 8, wherein said second conductive structure includes at least one layer of a metal, a metal alloy, a metallic film or a combination or mixture thereof as a substrate.

14. An electrochemical energy storage device as in claim 13, wherein said at least one layer of a metal, metal alloy, metallic film or combination or mixture thereof includes at least one of the group comprising: nickel, chromium, lead, tin, silver, titanium, brass, gold, copper and bronze.

15. An electrochemical energy storage device as in claim 13, wherein said conductive polymer layer includes at least one of a conductive polymer, a polymer composite including a conductive filler or a combination thereof as a facing on said substrate.

16. An electrochemical energy storage device as in claim 15, wherein said at least one of a conductive polymer, a polymer composite including a conductive filler, or a combination thereof is disposed onto said substrate by one of the group of techniques consisting of:
   screen printing;
   brush painting;
   propellant spray/air brushing; and
   casting.

17. An electrochemical energy storage device as in claim 1, wherein said plurality of electrodes comprise a carbon material and a protonic medium, wherein said protonic medium is selected from the group of materials consisting of: water, aqueous acid solutions, sulfonic acids, polysulfonic acids such as polyvinyl sulfonic acid, protonic acids, compounds with one or more alcoholic hydroxyl groups, compounds with one or more carboxylic acid groups, compounds with one or more of the following groups: sulfonimides, $BPO_2H_2$, $-CH_2PO_3H_2$, $-OSO_3H$, $-OPO_2H_2$, $-OPO_3H_2$, $-OArSO_3H$, and combinations thereof.

18. An electrochemical energy storage device as in claim 1, wherein said plurality of electrodes comprise a carbon material and an aqueous acid.

19. An electrochemical energy storage device as in claim 18, wherein said aqueous acid is sulfuric acid with a concentration within the range from about 1 to about 8 molar.

20. An electrochemical energy storage device as in claim 18, wherein the content of said carbon material within said plurality of electrodes is between about 8 to about 36 weight per cent.

21. An electrochemical energy storage device as in claim 17, wherein the thickness of each of said electrodes is between about 30 to about 300 microns.

22. An electrochemical energy storage device as in claim 1, wherein said energy storage device comprises a double-layer capacitor, a pseudo-capacitor, a battery or parallel combinations thereof.

23. An electrochemical energy storage device as in claim 1, wherein the thickness of said device is between about 0.3 and about 3 millimeters.

24. An electrochemical energy storage device as in claim 1, wherein the thickness of said device is between about 0.3 and about 1 millimeter.

25. A method for forming an electrochemical energy storage device, the steps comprising:
provides a plurality of frames stacked generally parallel with each other with each of said frames defining a plurality of openings;
affixing a plurality of electrodes within selected openings in each of said plurality of frames;
providing a plurality of current collectors, said current collectors being affixed to said plurality of frames;
providing a plurality of proton conductive membranes, wherein each of said membranes is between a pair of opposing ones of said electrodes and wherein said pair of opposing electrodes and associated proton conductive membrane defines a cell; and
joining together a plurality of cells into a plurality of stacks connected in series by said plurality of current collectors to form said device.

26. A method of forming an electrochemical energy storage device as in claim 25, wherein said plurality of frames are a non-conductive material.

27. A method of forming an electrochemical energy storage device as in claim 26, wherein said non-conductive material comprises a plastic.

28. A method of forming an electrochemical energy storage device as in claim 25, wherein said plurality of current collectors comprise at least one bi-polar current collector which remains internal to the device, at least one common current collector which provides external longitudinal electrical connection between in-plane cells, and external terminal current collectors which provide for electrical connection of the device to external circuitry.

29. A method of forming an electrochemical energy storage device as in claim 28, wherein said at least one common current collector further comprises a unitary extension tab structure.

30. A method of forming an electrochemical energy storage device as in claim 28, wherein said external terminal current collectors further comprise a unitary extension tab structure.

31. A method of forming an electrochemical energy storage device as in claim 28, wherein said at least one common current collector and said external terminal current collectors are multi-layered.

32. A method of forming an electrochemical energy storage device as in claim 31, wherein said at least one common current collector and said external terminal current collectors comprise a conductive polymer layer adjacent to said plurality of electrodes when affixed to said frames and a second conductive structure on a side of said conductive polymer layer opposing said plurality of electrodes.

33. A method of forming an electrochemical energy storage device as in claim 32, wherein said conductive polymer layer includes at least one of a conductive polymer, a polymer composite including a conductive filler or a combination thereof and wherein said conductive polymer layer serves as a substrate.

34. A method of forming an electrochemical energy storage device as in claim 33, wherein said second conductive structure includes at least one layer of a metal, a metal alloy, a metallic film or a combination or mixture thereof as a facing on said substrate.

35. A method of forming an electrochemical energy storage device as in claim 34, wherein said at least one layer of a metal, metal alloy, metallic film or a combination or mixture thereof includes at least one of the group comprising: nickel, chromium, lead, tin, silver, titanium, brass, gold, copper and bronze.

36. A method of forming an electrochemical energy storage device as in claim 34, wherein said at least one layer of a metal, metal alloy, metallic film or a combination or mixture thereof is disposed onto said substrate by one of the group of techniques consisting of:
vacuum deposition;
flame spray coating;
molten dip bath;
heat lamination;
electro-less deposition;
electroplating;
plasma deposition;
sputtering; and
propellant spray/air brush of metal particles in a carrier.

37. A method of forming an electrochemical energy storage device as in claim 32, wherein said second conductive structure includes at least one layer of a metal, a metal alloy, a metallic film or a combination or mixture thereof as a substrate.

38. A method of forming an electrochemical energy storage device as in claim 37, wherein said at least one layer of a metal, metal alloy, metallic film or combination or mixture thereof includes at least one of the group comprising:
nickel, chromium, lead, tin, silver, titanium, brass, gold, copper and bronze.

39. A method of forming an electrochemical energy storage device as in claim 37, wherein said conductive polymer layer includes at least one of a conductive polymer, a polymer composite including a conductive filler or a combination thereof as a facing on said substrate.

40. A method of forming an electrochemical energy storage device as in claim 39, wherein said at least one of a conductive polymer, a polymer composite including a conductive filler or a combination thereof is disposed onto said substrate by one of the group of techniques consisting of:
screen printing;
brush painting;
propellant spray/air brushing; and
casting.

41. A method of forming an electrochemical energy storage device as in claim 25, wherein said plurality of electrodes comprise a carbon material and a protonic medium, wherein said protonic medium is selected from the group of materials consisting of: water, aqueous acid solutions, sulfonic acids, poly-sulfonic acids such as polyvinyl sulfonic acid, protonic acids, compounds with one or more alcoholic hydroxyl groups, compounds with one or more carboxylic acid groups, compounds with one or more of the following groups: sulfonimides, $BPO_2H_2$, $-CH_2PO_3H_2$, $-OSO_3H$, $-OPO_2H_2$, $-OPO_3H_2$, $-OArSO_3H$, and combinations thereof.

42. A method of forming an electrochemical energy storage device as in claim 25, wherein said plurality of electrodes comprise a carbon material and an aqueous acid.

43. A method of forming an electrochemical energy storage device as in claim 42, wherein said aqueous acid is sulfuric acid with a concentration within the range from about 1 to about 8 molar.

44. A method of forming an electrochemical energy storage device as in claim 42, wherein the content of said carbon material within said plurality of electrodes is between about 8 to about 36 weight per cent.

45. A method of forming an electrochemical energy storage device as in claim 44, wherein the thickness of each of said electrodes is between about 30 to about 300 microns.

46. A method of forming an electrochemical energy storage device as in claim 25, wherein said energy storage device comprises a double-layer capacitor, a pseudo-capacitor, a battery or parallel combinations thereof.

47. A method of forming an electrochemical energy storage device as in claim 25, wherein the thickness of said device is between about 0.3 and about 3 millimeters.

48. A method of forming an electrochemical energy storage device as in claim 25, wherein the thickness of said device is between about 0.3 and about 1 millimeter.

49. An electrochemical energy storage device, comprising:

- a plurality of non-conductive frames stacked generally parallel to each other with at least one opening in each of said frames;
- a plurality of high-surface-area carbon/aqueous acid electrodes, said plurality of electrodes being affixed within said at least one opening in each of said plurality of non-conductive frames;
- a plurality of multi-layer current collectors, said current collectors being affixed to said plurality of planar frames;
- a plurality of proton conductive membranes, wherein each of said membranes is between a pair of opposing ones of said plurality of electrodes and wherein said pair of opposing electrodes and associated proton conductive membrane defines a cell; and
- at least a pair of tab structures, said tab structures being electrically connected to said multi-layer current collectors.

50. An electrochemical energy storage device as in claim 49, wherein said plurality of current collectors comprise a conductive polymer layer adjacent to said plurality of said electrodes when affixed to said planar frames and a second conductive structure on a side of said conductive polymer layer opposing said plurality of electrodes.

51. An electrochemical energy storage device as in claim 50, wherein said plurality of current collectors comprise at least one bi-polar current collector which remains internal to the device, at least one common current collector which provides external longitudinal electrical connection between in-plane cells, and external terminal current collectors which provide for electrical connection of the device to external circuitry via said tab structures.

* * * * *